United States Patent
Johnson et al.

(10) Patent No.: US 8,175,112 B1
(45) Date of Patent: May 8, 2012

(54) MONITORING AND CONTROL OF AN ETHERNET LINK USING PSEUDO-WIRE INTERFACES

(75) Inventors: Harold W. Johnson, Roach, MO (US); Claudio R. Lima, San Jose, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1867 days.

(21) Appl. No.: 11/146,594

(22) Filed: Jun. 7, 2005

(51) Int. Cl.
*H04J 3/16* (2006.01)

(52) U.S. Cl. ...................................... 370/468

(58) Field of Classification Search .................. 370/351, 370/352, 389, 401, 444, 465, 468, 477; 709/724
See application file for complete search history.

(56) References Cited

U.S. PATENT DOCUMENTS

| | | | | |
|---|---|---|---|---|
| 6,144,669 | A * | 11/2000 | Williams et al. | 370/401 |
| 7,257,640 | B1 * | 8/2007 | Callocchia et al. | 709/233 |
| 7,453,804 | B1 * | 11/2008 | Feroz et al. | 370/230 |
| 2001/0049619 | A1 * | 12/2001 | Powell et al. | 705/9 |
| 2002/0152303 | A1 * | 10/2002 | Dispensa | 709/224 |
| 2002/0167967 | A1 * | 11/2002 | Jammes et al. | 370/468 |
| 2003/0123393 | A1 * | 7/2003 | Feuerstraeter et al. | 370/235 |
| 2004/0156313 | A1 * | 8/2004 | Hofmeister et al. | 370/229 |
| 2004/0218586 | A1 * | 11/2004 | Khoury et al. | 370/352 |
| 2005/0160180 | A1 * | 7/2005 | Rabje et al. | 709/238 |
| 2006/0227767 | A1 * | 10/2006 | Johnson et al. | 370/356 |

OTHER PUBLICATIONS

Riegel, M., "Requirements for Edge-to-Edge Emulation of TDM Circuits over Packet Switching Networks," draft-ietf-pwe3-tdm-requirements-08.txt: Network Working Group Apr. 10, 2005; http://www.ietf.org/internet-drafts/draft-ietf-pwe3-tdm-requirements-08.txt; obtained Jun. 6, 2005.

* cited by examiner

*Primary Examiner* — Derrick Ferris
*Assistant Examiner* — Mohammad Anwar

(57) ABSTRACT

A communication system uses an Ethernet link to provide services to a user. The services have service priorities and bandwidth allocations on the Ethernet link. A pseudo-wire interface exchanges user communications for the services over the Ethernet link and transfers performance information indicating the performance of the Ethernet link. A management system processes the performance information and the service priorities to determine if a bandwidth adjustment should be made. The management system processes the performance information, the service priorities, and any bandwidth adjustment to determine if a status message should be transferred to the Ethernet service provider and to determine a message priority for the status message. The speed of response by the Ethernet service provider to the status message is indicated by the message priority.

20 Claims, 2 Drawing Sheets

MONITORING AND CONTROL OF AN ETHERNET LINK USING PSEUDO-WIRE INTERFACES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the monitoring and control of an Ethernet link by using a pseudo-wire interface.

2. Description of the Prior Art

Many communication service providers now provide Ethernet links to end-users and telecommunication networks. In some cases, the telecommunication network may use these third-party Ethernet links to connect customers with their network. The telecommunication network may also use the Ethernet links to connect remote systems together, such as base stations and switching centers.

Pseudo-wire interfaces are used to access the Ethernet link. For example, two pseudo-wire interfaces could be coupled to opposite ends of an Ethernet link provided by a third-party. One pseudo-wire interface could be located at a user site, and the other pseudo-wire interface could be located in the telecommunication network. On the user side and on the network side, the pseudo-wire interfaces exchange user traffic in numerous formats, such as packet and time division multiplex. The pseudo-wire interfaces exchange this user traffic with one another over the third-party Ethernet link.

The pseudo-wire interfaces monitor the performance of the Ethernet link. Unfortunately, effective techniques for controlling the pseudo-wire interfaces to maintain quality-of-service on the Ethernet link at the service level are not available. In addition, effective status messaging between the telecommunication network and the Ethernet service provider to maintain quality-of-service on the Ethernet link at the service level is not available.

SUMMARY OF THE INVENTION

Examples of the invention include communication systems and their methods of operation. In some examples of the invention, a communication system is configured to use an Ethernet link provided by an Ethernet service provider to provide a first service and a second service to a user. The first service has a first service priority and a first bandwidth allocation on the Ethernet link. The second service has a second service priority and a second bandwidth allocation on the Ethernet link. The communication system comprises a pseudo-wire interface and a management system. The pseudo-wire interface is configured to exchange user communications for the first service and for the second service over the Ethernet link. The pseudo-wire interface is configured to transfer performance information indicating the performance of the Ethernet link. The management system is configured to receive and process the performance information and the service priorities to determine if a bandwidth adjustment should be made to at least one of the first bandwidth allocation and the second bandwidth allocation. The management system is configured to process the performance information, the service priorities, and the bandwidth adjustment if any to determine if a status message should be transferred to the Ethernet service provider and to determine a message priority for the status message. The speed of response by the Ethernet service provider to the status message is indicated by the message priority for the status message.

In some examples of the invention, the management system is configured to transfer a control message indicating the bandwidth adjustment and the pseudo-wire interface is configured to receive and process the control message to adjust at least one of the first bandwidth allocation and the second bandwidth allocation.

In some examples of the invention, the management system is configured to transfer the status message indicating the message priority and the performance information to the Ethernet service provider.

In some examples of the invention, the performance information indicates a problem on the Ethernet link and wherein the bandwidth adjustment indicates a reduction in the second bandwidth allocation.

In some examples of the invention, the performance information indicates that a problem on the Ethernet link has been corrected and wherein the bandwidth adjustment indicates an increase in the second bandwidth allocation.

In some examples of the invention, the first service comprises voice communications and the second service comprises Internet communications.

In some examples of the invention, the bandwidth adjustment comprises a reduction in one of the bandwidth allocations for one of the services having the lowest priority.

In some examples of the invention, the pseudo-wire interface includes physically separate ports and is configured to exchange the user communications for the first service with the user through a first one of the ports and to exchange the user communications for the second service with the user through a second one of the ports.

In some examples of the invention, the pseudo-wire interface includes physically separate ports and is configured to exchange the user communications for the first service with a first service system through a first one of the ports and to exchange the user communications for the second service with a second service system through a second one of the ports.

In some examples of the invention, the user comprises a base station that exchanges the user communications in a wireless format with wireless communication devices.

BRIEF DESCRIPTION OF THE DRAWINGS

The same reference number represents the same element on all drawings.

DETAILED DESCRIPTION OF THE PREFERRED EMBODIMENT

Figure 1:
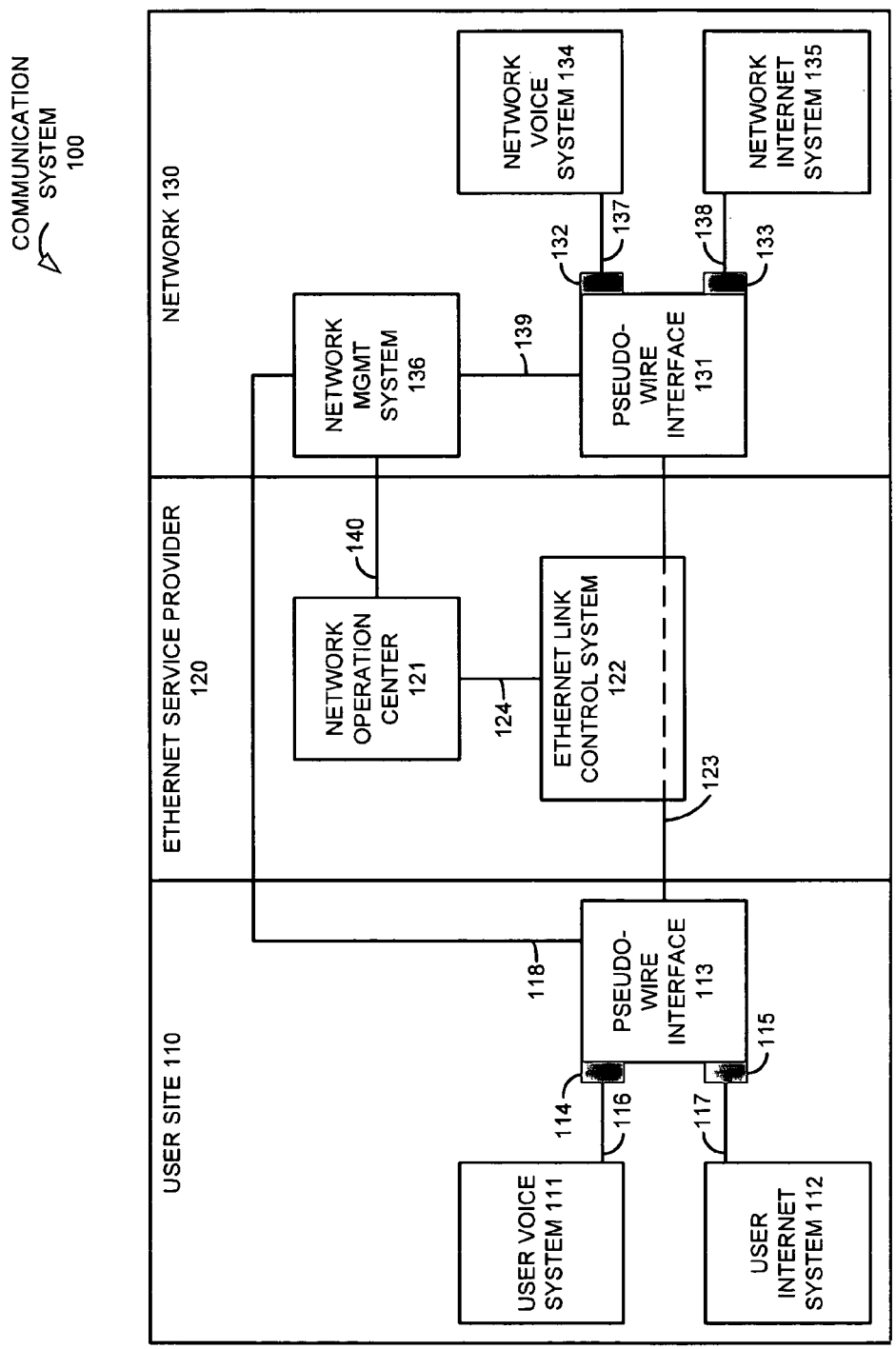
FIG. 1 illustrates a communication system in an example of the invention.
Figure 2:
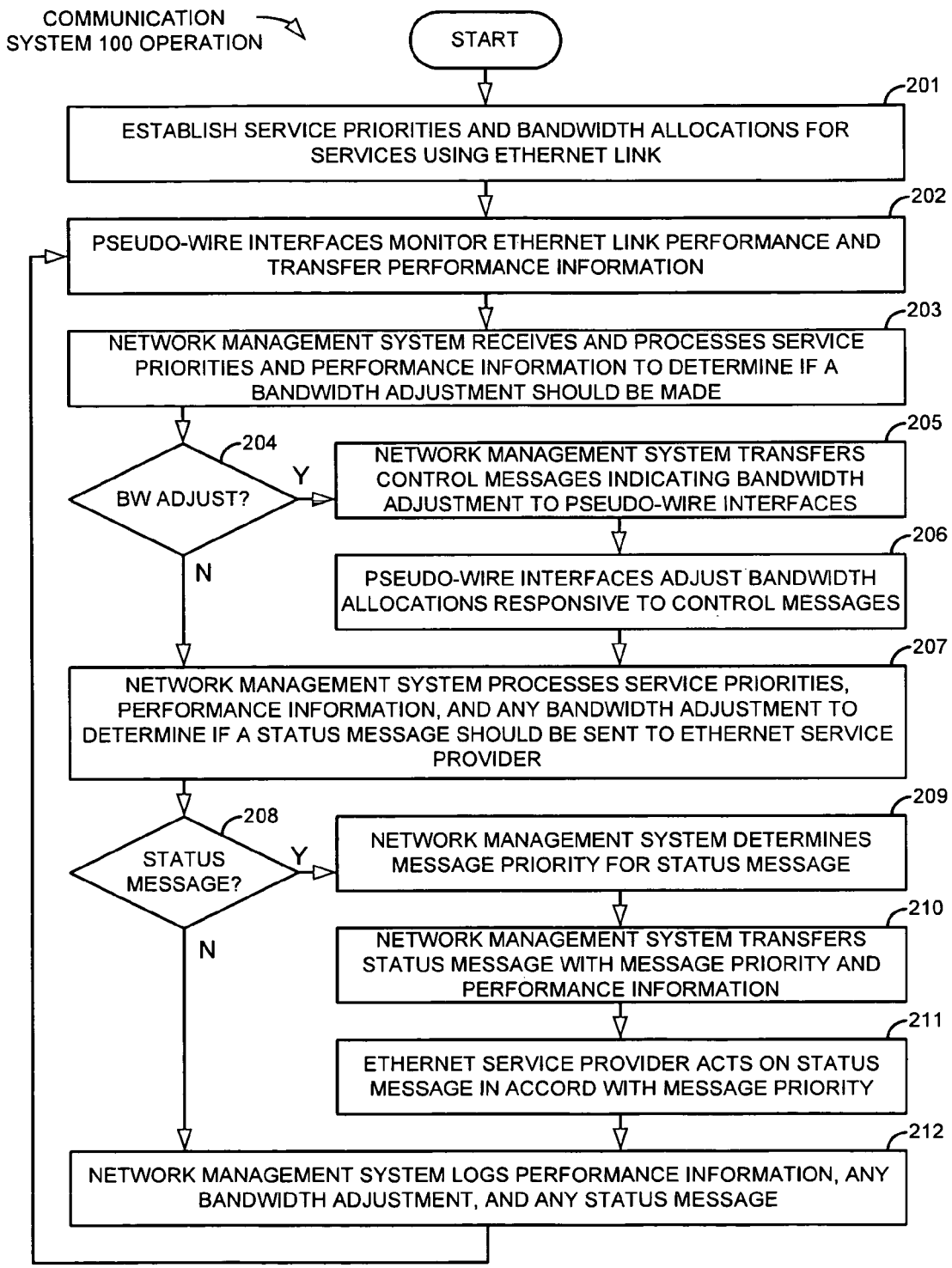
FIG. 2 illustrates communication system operation in an example of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Communication System Configuration

FIG. 1 illustrates communication system 100 in an example of the invention. Communication system 100 includes user site 110, Ethernet service provider 120, and network 130. User site 110 includes user voice system 111, user Internet system 112, and pseudo-wire interface 113. Pseudo-wire interface 113 includes ports 114-115 which are physically separate from one another. Ethernet service provider 120 includes Network Operation Center (NOC) 121, Ethernet link control system 122, and Ethernet link 123. Network 130 includes pseudo-wire interface 131, network voice system 134, network Internet system 135, and Network Management System (NMS) 136. Pseudo-wire interface 131 includes ports 132-133 which are physically separate from one another.

At user site 110, user voice system 111 and port 114 of pseudo-wire interface 113 exchange user communications for the voice service over user link 116. User Internet system 112 and port 115 of pseudo-wire interface 113 exchange user communications for the Internet service over user link 117. Note that pseudo-wire interface 113 physically separates the services on the user side by using physically separate ports 114-115 for each service. Links 116-117 typically include sub-links and components that are not shown for clarity.

In network 130, port 132 of pseudo-wire interface 131 and network voice system 134 exchange user communications for the voice service over network link 137. Port 133 of pseudo-wire interface 131 and network Internet system 135 exchange user communications for the Internet service over network link 138. Note that pseudo-wire interface 131 physically separates the services on the network side by using physically separate ports 132-133 for each service. Links 137-138 typically include sub-links and components that are not shown for clarity.

Pseudo-wire interface 113 and pseudo-wire interface 131 exchange the user communications for the voice service and the Internet service over Ethernet link 123. Ethernet link 123 typically includes sub-links and components that are not shown for clarity. Ethernet link control system 122 controls Ethernet link 123 by controlling these sub-links and components. NOC 121 provides instructions to Ethernet link control system 122 over control link 124.

User voice system 111 at user site 110 exchanges user communications for the voice service with network voice system 134 in network 130 over interfaces 113 and 131 and links 116, 123, and 137. Network voice system 134 processes the user communications to provide a voice service, such as telephony or push-to-talk, to user voice system 111. User Internet system 112 at user site 110 exchanges user communications for the Internet service with network Internet system 135 in network 130 over interfaces 113 and 131 and links 117, 123, and 138. Network Internet system 135 processes the user communications to provide an Internet service, such as Internet access, to user Internet system 112. Other services, such as private data services, could be provided in a similar fashion.

The voice service has a first bandwidth allocation on Ethernet link 123, and the Internet service has a second bandwidth allocation on Ethernet link 123. For example, Ethernet link 123 may have a bandwidth of 10 gigabit per second, and the voice service may have a bandwidth allocation of 4 gigabits per second, and the Internet service may have a bandwidth allocation of 6 gigabits per second. In addition, the voice service has a first priority, and the Internet service has a second priority. For example, on a priority scale of one through ten with one being high, the voice service may have a high priority of two, and the Internet service may have a lower priority of seven.

In some variations, user site 110 represents a customer site for a customer of network 130. In some variations, user site 110 represents a wireless base station that exchanges user communications in a wireless format with wireless communication devices.

Communication System Operation

FIG. 2 illustrates the operation of communication system 100 in an example of the invention. The reference numbers on FIG. 2 are indicated parenthetically below. The operation starts with the establishment of service priorities and bandwidth allocations for the services (201). For example, the voice service may get a service priority of two and a bandwidth allocation of 4 gigabits per second, and the Internet service may get a priority of eight and a bandwidth allocation of 6 gigabits per second.

Pseudo-wire interfaces 113 and 131 monitor the performance of Ethernet link 123 in Ethernet service provider 120 (202). Pseudo-wire interfaces 113 and 131 transfer performance information indicating the monitored performance of Ethernet link 123 to NMS 136 over respective links 118 and 139 (202). Performance monitoring could entail measurements for packet loss, packet delay, jitter, and bit error rates, although other types of performance monitoring could be used.

NMS 136 receives and processes the performance information and the service priorities to determine if a bandwidth adjustment should be made to at least one of the bandwidth allocations (203-204). To make this determination, NMS 136 could compare performance data for packet loss, packet delay, jitter, and bit error rates to various thresholds to identify problems or opportunities. Logical combinations of thresholds could be used, such as packet delay exceeding a first threshold and a bit error rate exceeding a second threshold. NMS 136 could also factor in the service priorities. For example, no bandwidth reductions may be allowed for services with a high priority of one or two, but bandwidth adjustments may always be available for services with a low priority of nine or ten. Thus, the bandwidth adjustments can be correlated to both link performance and service priorities.

If NMS 136 determines that an adjustment to a bandwidth allocation is needed (204), then NMS 136 transfers control messages to pseudo-wire interfaces 113 and 131 indicating the bandwidth adjustment (205) over links 118 and 139. Pseudo-wire interfaces 113 and 131 receive and process the control messages to make the bandwidth adjustment in response to the control messages (206). For example, NMS 136 could reduce the bandwidth allocation for the Internet service from 6 gigabits per second to 4 gigabits per second, because the packet delay and bit error rate both exceed their thresholds for the voice service, thus possibly having a negative effect on voice service, and because the Internet service priority is eight (which is lower than a service priority of two as in the voice service example). In response to the control messages, pseudo-wire interfaces 113 and 131 would limit the bandwidth for the Internet service to 4 gigabits per second by limiting the bandwidth through ports 115 and 133, which are physically assigned to the Internet service. Hopefully, the reduction in bandwidth for the Internet service will help the quality of service for the higher priority voice service—without reducing the bandwidth allocation to the higher priority voice service.

In another example, NMS 136 could increase the bandwidth allocation for the Internet service from 4 gigabits per second back to 6 gigabits per second, because packet delay and bit error rates both drop below their thresholds. In response to the control messages, pseudo-wire interfaces 113 and 131 would increase the bandwidth for the Internet service back to 6 gigabits per second by increasing the bandwidth through ports 115 and 133, which are physically assigned to the Internet service. The increase in bandwidth for the Internet service should not impair the quality of service for the higher priority voice service given the improved performance of Ethernet link 123.

After the bandwidth adjustment (205-206) or if no bandwidth adjustment is made (204), NMS 136 processes the performance information, the service priorities, and any bandwidth adjustment to determine if a status message should be transferred to Ethernet service provider 120 (207-208). To make this determination, NMS 136 could compare performance data for packet loss, packet delay, jitter, and bit error rates to various thresholds to identify problems. Logical combinations of thresholds could be used, such as packet delay exceeding a first threshold and a bit error rate exceeding a second threshold. For example, a status message may be needed where the performance information indicates that two performance measurements have exceeded their given thresholds and where a service on the link has a priority greater than three. If a bandwidth adjustment has been made to solve a temporary problem, then no status message may be required.

If NMS 136 determines that a status message should be sent (208), then NMS 136 determines a message priority for the status message (209). The message priority indicates a speed of response by the Ethernet service provider to the status message. For example, there could be five message priorities with a message priority of one indicating immediate action is expected in response to the status message and with a message priority of five indicating that no action is expected. Message priorities 2-4 could have various response times—respectively one day, five days, and 30 days—to act on the status message. For example, a message priority of two could indicate to Ethernet service provider 120 that the performance of Ethernet link 123 should be within expected tolerances within 24 hours. To make the message priority determination, NMS 136 could compare performance data for packet loss, packet delay, jitter, and bit error rates to various thresholds to identify problems. Logical combinations of thresholds could be used, such as packet delay exceeding a first threshold and a bit error rate exceeding a second threshold. NMS 136 could also factor in the service priorities and any bandwidth adjustments. For example, NMS 136 may increase the message priority from 3 to 2 if a bandwidth adjustment has already been made in response to a problem. In addition, NMS 136 may increase the message priority to one if a service on the link has the highest service priority of one. In another example, NMS 136 may lower the message priority to four if a previous bandwidth reduction should be effective to handle a temporary loss of performance on Ethernet link 123. Thus, the status message and its priority can be correlated to link performance, service priorities, and any bandwidth adjustments.

If NMS 136 determines that a status message having a selected message priority should be sent to Ethernet service provider 120 (209), then NMS 136 transfers the status message to NOC 121 in Ethernet service provider 120 over link 140, where the status message indicates the message priority and the performance information (210). NOC 121 in Ethernet service provider 120 receives and process the status message to respond within the time period indicated by the message priority (211). The response or action taken by Ethernet service provider 120 could be to get Ethernet link 123 within predetermined performance tolerances within the time frame set by the message priority. For example, NOC 121 could immediately allocate more bandwidth to Ethernet link 123 in response to a status message having a message priority of one. NOC 121 could implement such a response by sending instructions to Ethernet link control system 122 over link 124. Ethernet link control system 122 could apply conventional control techniques to implement the instructions provided by NOC 121.

After sending a status message (210) or if no status message is sent (208), NMS 136 logs the performance information, any bandwidth adjustments, and any status message, and the process returns to performance monitoring (202).

In some variations, the status message comprises a trouble report that is transferred to Ethernet service provider 120. In some variations, Ethernet service provider 120 could be a separate business entity from network 130. Thus, NMS 136 could automatically transfer trouble reports (status messages) to a third-party Ethernet service provider in response to performance problems in the third-party Ethernet network.

Communication System Advantages

The communication system is able to directly control the Ethernet link by using the pseudo-wire interfaces to adjust bandwidth at the service level. The communication system is able to indirectly control the Ethernet link by messaging the Ethernet service provider. This status messaging indicates a message priority to help the Ethernet service provider respond in the proper timeframe. Advantageously, the communication system correlates bandwidth adjustments and prioritized status messaging with one another and with both link performance and service priorities.

If the performance information indicates a problem on the Ethernet link, such as jitter exceeding a threshold, then the bandwidth allocated to the lowest priority service can be reduced to help the quality-of-service for higher-priority services on the problematic Ethernet link. When the performance information indicates that the problem on the Ethernet link has been corrected, then the reduced bandwidth allocated to the lowest priority service can be increased back to its former allocation.

Thus, the pseudo-wire interfaces and NMS effectively integrate performance monitoring with service priorities to control bandwidth allocations through a third-party Ethernet service provider that is ignorant of the services and their service priorities. The pseudo-wire interfaces and NMS also provide prioritized status messaging to the Ethernet service provider that takes into account the performance monitoring, service priorities, and any bandwidth adjustments. Advantageously, the above-described communication system allows a network to use cost-effective third-party Ethernet links but to maintain effective quality-of-service at the service level for the services that utilize the Ethernet link.

The invention claimed is:

1. A communication system configured to use an Ethernet link provided by an Ethernet service provider to provide a first service and a second service to a user, wherein the first service has a first service priority and a first bandwidth allocation on the Ethernet link, and wherein the second service has a second service priority and a second bandwidth allocation on the Ethernet link, the communication system comprising:

a pseudo-wire interface configured to exchange user communications for the first service and for the second service over the Ethernet link and to transfer performance information indicating performance of the Ethernet link; and a management system configured to receive and process the performance information and the first and the second service priorities to determine if a bandwidth adjustment should be made to at least one of the first bandwidth allocation and the second bandwidth allocation, and to process the performance information, the first and the second service priorities, and the bandwidth adjustment if any to determine if a status message should be transferred to the Ethernet service provider and to determine a message priority for the status message, wherein a speed of response by the Ethernet service provider to the status message is indicated by the message priority.

2. The communication system of claim 1 wherein the management system is configured to transfer a control message indicating the bandwidth adjustment and the pseudo-wire interface is configured to receive and process the control message to adjust at least one of the first bandwidth allocation and the second bandwidth allocation.

3. The communication system of claim 1 wherein the management system is configured to transfer the status message indicating the message priority and the performance information to the Ethernet service provider.

4. The communication system of claim 1 wherein the performance information indicates a problem on the Ethernet link and wherein the bandwidth adjustment indicates a reduction in the second bandwidth allocation.

5. The communication system of claim 1 wherein the performance information indicates that a problem on the Ethernet link has been corrected and wherein the bandwidth adjustment indicates an increase in the second bandwidth allocation.

6. The communication system of claim 1 wherein the first service comprises voice communications and the second service comprises Internet communications.

7. The communication system of claim 1 wherein the bandwidth adjustment comprises a reduction in at least one of the first bandwidth allocation and the second bandwidth allocation for one of the services having a lowest one of the first service priority and the second service priority.

8. The communication system of claim 1 wherein the pseudo-wire interface includes physically separate ports and is configured to exchange user communications for the first service with the user through a first one of the ports and to exchange the user communications for the second service with the user through a second one of the ports.

9. The communication system of claim 1 wherein the pseudo-wire interface includes physically separate ports and is configured to exchange the user communications for the first service with a first service system through a first one of the ports and to exchange the user communications for the second service with a second service system through a second one of the ports.

10. The communication system of claim 1 wherein the user comprises a base station that exchanges the user communications in a wireless format with wireless communication devices.

11. A method of operating a communication system to use an Ethernet link provided by an Ethernet service provider to provide a first service and a second service to a user, wherein the first service has a first service priority and a first bandwidth allocation on the Ethernet link, and wherein the second service has a second service priority and a second bandwidth allocation on the Ethernet link, the method comprising:

in a pseudo-wire interface, exchanging user communications for the first service and for the second service over the Ethernet link;

in the pseudo-wire interface, transferring performance information indicating performance of the Ethernet link;

in a management system, receiving and processing the performance information and the first and the second service priorities to determine if a bandwidth adjustment should be made to at least one of the first bandwidth allocation and the second bandwidth allocation; and in the management system, processing the performance information, the first and the second service priorities, and the bandwidth adjustment if any to determine if a status message should be transferred to the Ethernet service provider and to determine a message priority for the status message, wherein a speed of response by the Ethernet service provider to the status message is indicated by the message priority.

12. The method of claim 11 further comprising:
in the management system, transferring a control message indicating the bandwidth adjustment; and
in the pseudo-wire interface, receiving and processing the control message to adjust at least one of the first bandwidth allocation and the second bandwidth allocation.

13. The method of claim 11 further comprising, in the management system, transferring the status message indicating the message priority and the performance information to the Ethernet service provider.

14. The method of claim 11 wherein the performance information indicates a problem on the Ethernet link and wherein the bandwidth adjustment indicates a reduction in the second bandwidth allocation.

15. The method of claim 11 wherein the performance information indicates that a problem on the Ethernet link has been corrected and wherein the bandwidth adjustment indicates an increase in the second bandwidth allocation.

16. The method of claim 11 wherein the first service comprises voice communications and the second service comprises Internet communications.

17. The method of claim 11 wherein the bandwidth adjustment comprises a reduction in at least one of the first bandwidth allocation and the second bandwidth allocation for one of the services having a lowest one of the first service priority and the second service priority.

18. The method of claim 11 wherein the pseudo-wire interface includes physically separate ports and the method further comprises, in the pseudo-wire interface, exchanging user communications for the first service with the user through a first one of the ports and exchanging the user communications for the second service with the user through a second one of the ports.

19. The method of claim 11 wherein the pseudo-wire interface includes physically separate ports and the method further comprises, in the pseudo-wire interface, exchanging the user communications for the first service with a first service system through a first one of the ports and exchanging the user communications for the second service with a second service system through a second one of the ports.

20. The method of claim 11 wherein the user comprises a base station that exchanges the user communications in a wireless format with wireless communication devices.

* * * * *